US008150604B2

(12) United States Patent
Ma et al.

(10) Patent No.: US 8,150,604 B2

(45) Date of Patent: Apr. 3, 2012

(54) METHOD AND APPARATUS FOR REDUCING SPARK PLUG FOULING

(75) Inventors: Qi Ma, Farmington Hills, MI (US); Dean Raymond Kwapis, White Lake, MI (US); Joseph Duarte, Dearborn, MI (US)

(73) Assignee: GM Global Technology Operations LLC

( * ) Notice: Subject to any disclaimer, the term of this patent is extended or adjusted under 35 U.S.C. 154(b) by 217 days.

(21) Appl. No.: 12/626,002

(22) Filed: Nov. 25, 2009

(65) Prior Publication Data

US 2011/0106412 A1 May 5, 2011

Related U.S. Application Data

(60) Provisional application No. 61/257,150, filed on Nov. 2, 2009.

(51) Int. Cl.
*G06F 19/00* (2011.01)

(52) U.S. Cl. ...................................................... 701/111

(58) Field of Classification Search .................. 701/111, 701/102, 113, 29; 123/491, 179.16–179.18
See application file for complete search history.

(56) References Cited

U.S. PATENT DOCUMENTS

| | | | | |
|---|---|---|---|---|
| 5,142,479 | A * | 8/1992 | Poirier et al. | 701/113 |
| 6,505,605 | B2 * | 1/2003 | Yamada et al. | 123/406.14 |
| 6,512,375 | B1 * | 1/2003 | Yamada et al. | 324/399 |
| 6,899,077 | B2 * | 5/2005 | Wagner et al. | 123/295 |
| 7,170,219 | B2 * | 1/2007 | Hori et al. | 313/141 |
| 7,809,494 | B2 * | 10/2010 | Nakagawa et al. | 701/113 |
| 7,840,334 | B2 * | 11/2010 | Nakagawa et al. | 701/103 |
| 2007/0056562 | A1 * | 3/2007 | Ma et al. | 123/478 |
| 2008/0319636 | A1 * | 12/2008 | Nakagawa et al. | 701/104 |
| 2009/0241520 | A1 * | 10/2009 | Gendron et al. | 60/295 |
| 2010/0057324 | A1 * | 3/2010 | Glugla et al. | 701/102 |
| 2011/0041803 | A1 * | 2/2011 | Qu et al. | 123/406.2 |

* cited by examiner

*Primary Examiner* — Stephen K Cronin
*Assistant Examiner* — Arnold Castro

(57) ABSTRACT

A control module and method for controlling an engine operation includes a runtime module that determines a previous run period, a fuel mass module that determines a fuel mass during the previous run period, a spark fouling condition estimation module that determines a spark fouling condition based on the fuel mass during the previous run period and an engine operation module that controls the engine in response to the spark fouling condition.

20 Claims, 3 Drawing Sheets

METHOD AND APPARATUS FOR REDUCING SPARK PLUG FOULING

CROSS-REFERENCE TO RELATED APPLICATIONS

This application claims the benefit of U.S. Provisional Application No. 61/257,150, filed on Nov. 2, 2009. The disclosure of the above application is incorporated herein by reference in its entirety.

FIELD

The present invention relates generally to engine controls for automotive vehicles, and, more specifically, to a method and apparatus for reducing spark plug fouling during engine operation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Spark plug fouling may prevent an engine from starting and/or increase cranking during starting. Types of spark plug fouling include carbon-fouled spark plugs or wet-fuel fouled spark plugs. Carbon-fouled spark plugs have increased carbon build-up on an electrode of the spark plug. Wet-fuel fouled spark plugs are caused by fuel buildup around the electrode.

Spark plug fouling may be caused by rich fueling during engine starts at cold temperatures, relatively short engine operation after the engine start, and the general working environment of the spark plug.

Spark plug fouling may increase warranty costs because the spark plugs may need to be replaced. Spark plug fouling may also increase the amount of emissions from the vehicle.

SUMMARY

The present disclosure reduces spark plug fouling by evaluating the fuel mass consumed in the last engine operation period and other factors. By reducing spark plug fouling, the warranty costs and product quality may be improved.

In one aspect of the invention, a method of operating an engine includes determining a previous run period, determining a fuel mass during the previous run period, determining a spark fouling condition based on the fuel mass during the previous run period and controlling the engine in response to the spark fouling condition.

In another aspect of the invention, a control module for controlling an engine operation includes a runtime module that determines a previous run period, a fuel mass module that determines a fuel mass during the previous run period, a spark fouling condition estimation module that determines a spark fouling condition based on the fuel mass during the previous run period and an engine operation module that controls the engine in response to the spark fouling condition.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
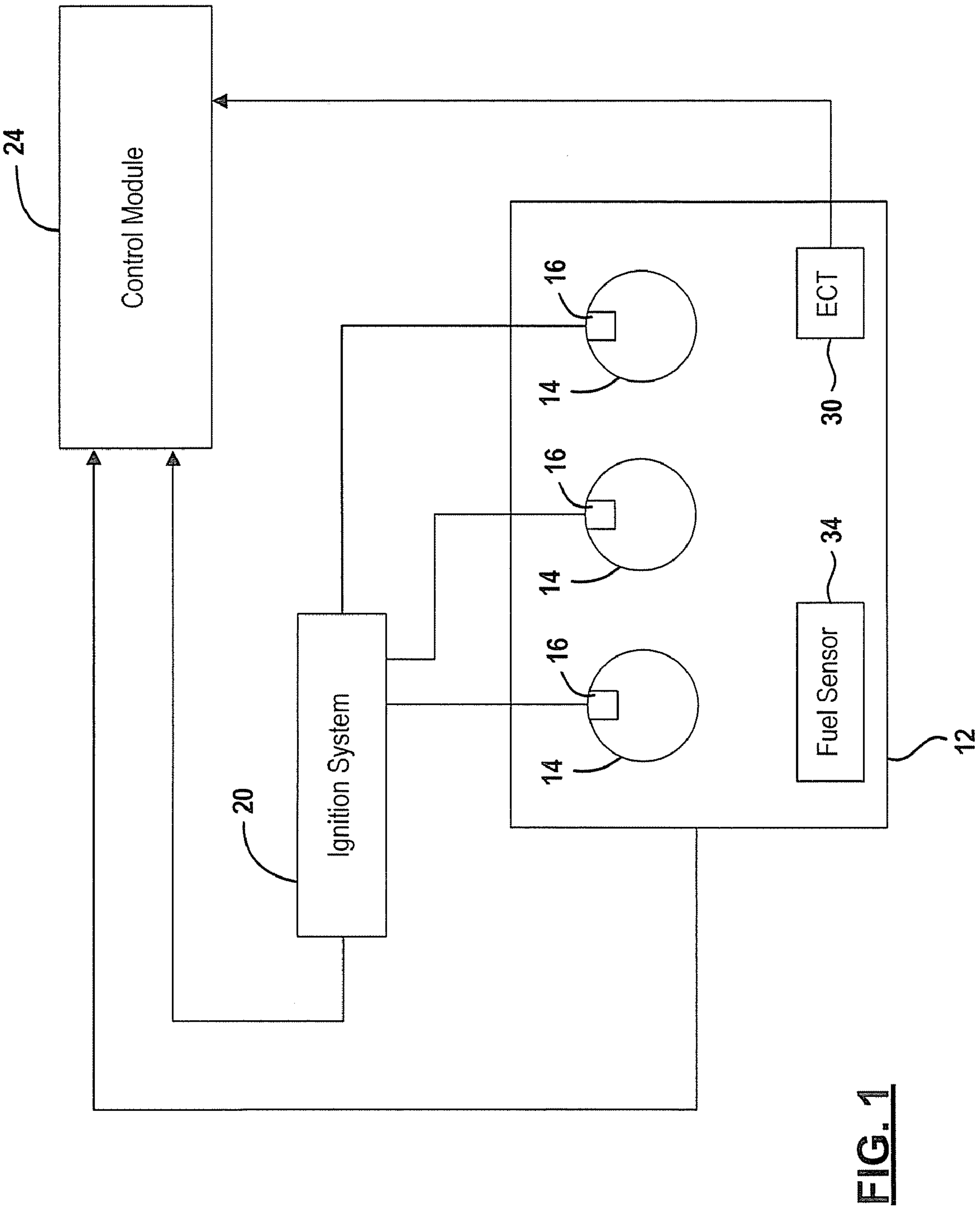
FIG. 1 is a high level schematic view of an engine having a spark plug fouling prevention strategy according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure provides a system and method for preventing spark plug fouling based upon various factors including fuel mass consumed during a last engine operation period. Other factors may include engine coolant temperature and ethanol percentage of the fuel. Various engine operation strategies may be performed to clean the spark plug and reduce the crank fuel level to further reduce carbon accumulation around the spark plug and reduce the risk of spark plug fouling during an engine start.

Referring now to FIG. 1, an engine 12 is illustrated having a plurality of cylinders 14. In the present illustration, three cylinders 14 are illustrated. However, the engine may include various numbers of cylinders including, but not limited to, two, four, five, six, eight and twelve. Each cylinder may include at least one spark plug 16. The spark plug 16 generates a spark through a gap between two electrodes that ignites the fuel injected into the engine.

An ignition system 20 controls the operation of the spark plugs based upon an output from a control module 24. The control module 24 may control the engine operating characteristics of the vehicle including the engine system 20 and other fuel-related components.

An engine coolant temperature sensor 30 may generate an engine coolant signal corresponding to the temperature of the engine coolant. The engine coolant temperature 30 may be stored within the control module 24 at various time periods. For example, the engine coolant temperatures may be recorded during a previous powering off or ending period of the previous operation of the engine. The previous operation of the engine may be referred to as a previous operating event. The engine coolant temperature may also be monitored just prior to the engine starting and determine the fouling conditions of the spark plug.

A fuel sensor 34 may generate a fuel composition signal corresponding to composition of the fuel. For example, the fuel sensor 34 may generate a signal corresponding to the amount of ethanol within the fuel. Commonly, ten percent ethanol is used in formulations of gasoline. However, higher ethanol percentages may be used in flexible fuel vehicles.

Figure 2:
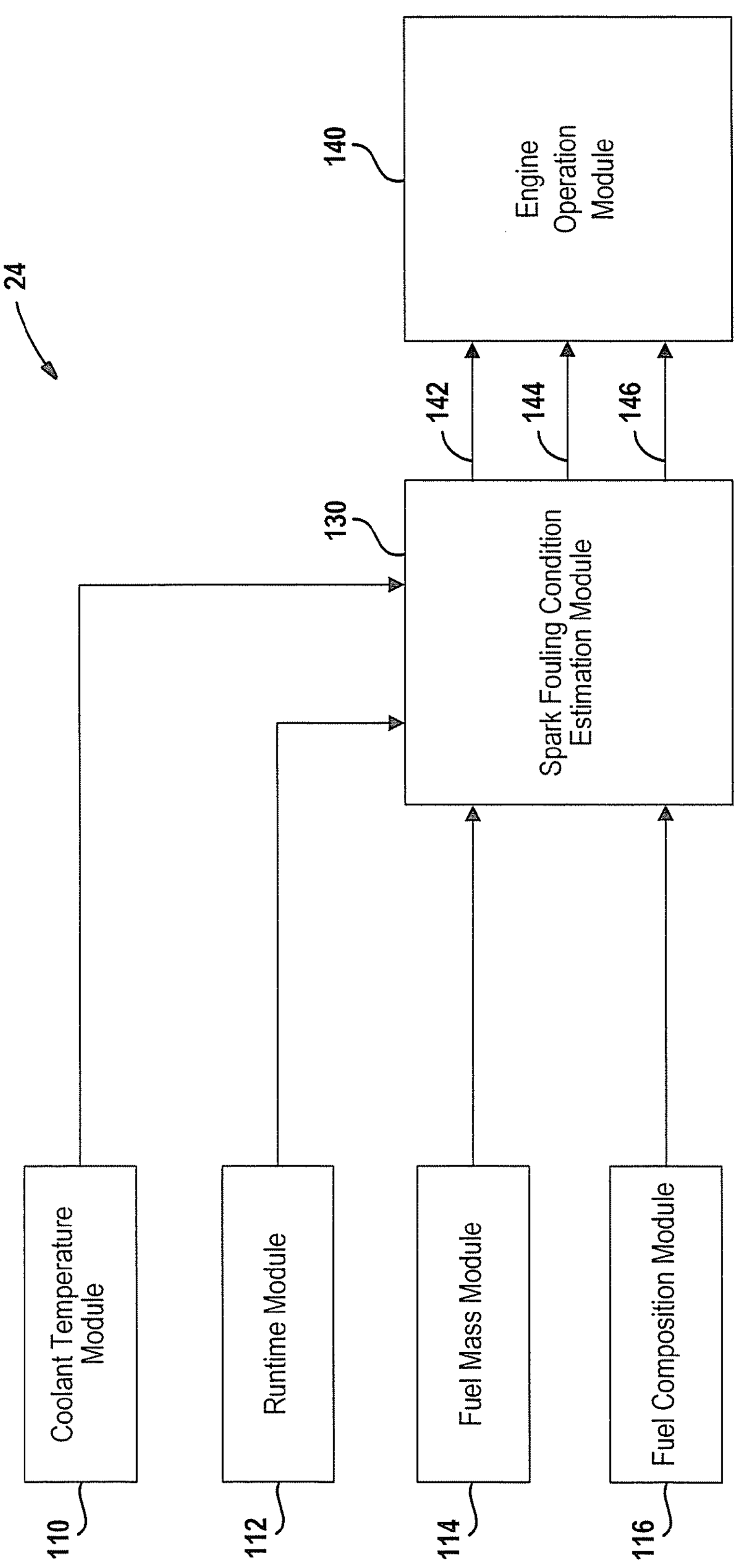
FIG. 2 is a block diagrammatic view of the engine controller of FIG. 1.

Referring now to FIG. 2, a block diagrammatic view of the control module 24 is illustrated. The control module 24 may include a coolant temperature module 110. The coolant temperature module 110 may store various coolant temperatures during the operation of the engine. The coolant temperature module 110 may store an engine coolant temperature during a previous run time. That is, the coolant temperature module 110 may store an ending coolant temperature corresponding to the previous time at which the engine was operated. The ending coolant temperature corresponds to the engine coolant temperature at or just prior to ending the engine operation. The engine coolant temperature module 110 may also record an engine coolant temperature prior to operating the engine. For example, just prior to providing fuel and spark to the engine in response to a key ON ignition condition, the coolant temperature module 110 may record an engine coolant temperature.

A run time module 110 may record the amount of time that the now shut-off engine was operated previously. The run time may correspond to the time from the ignition switch being turned on to the time the ignition switch was turned off during the previous operation of the vehicle.

A fuel mass module 114 may generate a fuel mass signal corresponding to the amount of fuel provided during a previous run time of the vehicle.

A fuel composition module 116 may generate a fuel composition signal corresponding to the amount of ethanol within the fuel. The fuel composition module 116 may receive a signal from the fuel sensor.

Each of the modules 110, 112, 114 and 116 may be in communication with a spark fouling condition estimator module 130. The spark fouling condition estimator module 130 may generate a spark fouling signal corresponding to the amount of spark fouling within the vehicle. The amount of spark fouling may depend upon the various conditions mentioned above, including the coolant temperature at the end of the previous run time, the amount of run time of the previous operation of the engine, the amount of fuel mass during the previous operation of the engine and the amount of ethanol within the fuel. The spark fouling condition estimation may also be dependent on various engine conditions. Therefore, the spark fouling may be calibrated for various engine configurations, engine operating conditions and spark plug configurations. The amount of various parameters described above may vary widely based upon engine conditions.

The engine operation module 140 may receive various fouling condition estimates based upon the various inputs to the spark fouling condition estimator module 130. The engine operating module 140 may receive a fuel shut-off duration signal 142 that controls the duration of the fuel shut-off during engine cranking conditions.

The engine operation module 140 may also generate a forced warm-up signal 144 that forces the engine and therefore the spark plug to warm up at a predetermined increased rate which is faster than a normal engine warm-up rate.

The engine operating module 140 may also receive a crank fuel reduction coefficient from the spark fouling condition estimator module 130. The crank fuel reduction coefficient signal 146 may provide a coefficient that is used to reduce the amount of fuel provided to the engine during the initial cranking or start-up of the engine.

Figure 3:
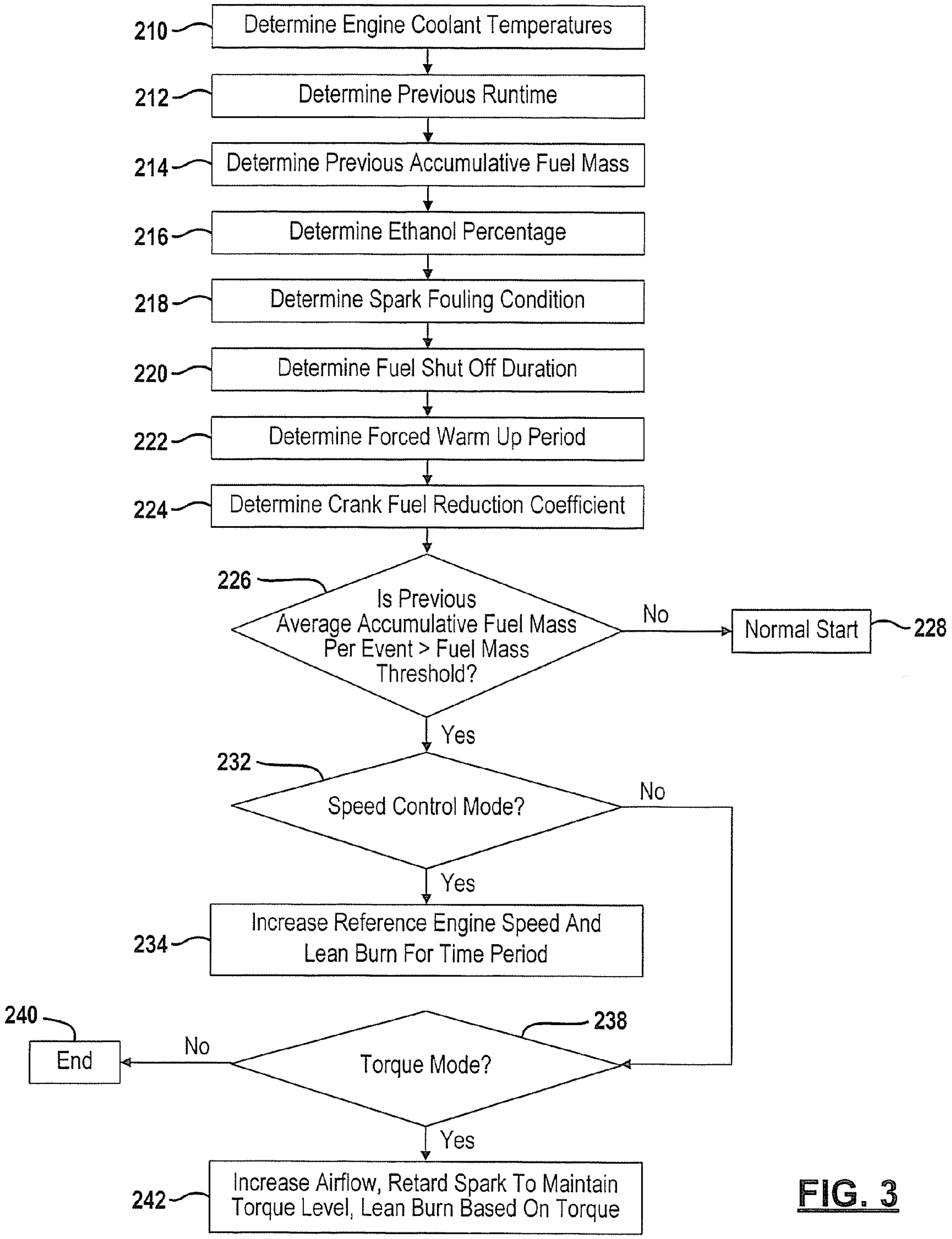
FIG. 3 is a flowchart of a method of operating the invention.

Referring now to FIG. 3, a method of operating the engine is set forth. In step 210, the engine coolant temperatures are determined. Engine coolant temperatures may be stored for various times including the previous powering off of the engine and before an engine starting condition.

In step 212, the run time of the engine is determined for the previous operating period. The run time corresponds to the time the engine was operated between a start and stopping of the engine. This may correspond to the amount of time between a key ON and a key OFF of an ignition or starting and stopping using a keyless ignition.

In step 214, the accumulated fuel mass of the previous engine operation may be determined. The previous accumulated fuel mass may correspond to the amount of fuel during the previous run time.

In step 216, the amount of ethanol within the fuel may be determined.

In step 218, the spark fouling condition is determined. The spark fouling condition may be based on the engine coolant temperatures, the run time of the vehicle, the accumulated fuel mass and the ethanol percentage.

In step 220, the fuel shut-off duration may be determined. The fuel shut-off duration may be used to reduce the amount of spark plug fouling.

In step 222, the spark plug fouling condition may also be controlled by forcing a warm-up of the spark plug. In step 222, the forced warm-up period may be determined based upon the spark fouling condition determined in step 218.

In step 224, a crank fuel reduction coefficient may be determined based upon the spark fouling condition determined in step 218. The crank fuel reduction coefficient may provide a coefficient that is used to reduce the amount of fuel during engine starting.

In step 226, after the spark fouling condition has been determined, the previous average accumulative fuel mass per event may be compared to a fuel mass threshold. The previous average accumulative fuel mass is not greater than an event, then a normal start may take place in step 228. If the previous average accumulative fuel mass per event is greater than a fuel mass threshold, step 232 determines whether the engine is in a speed control mode. If the engine is in a speed control mode, step 234 increases the reference engine speed and performs lean burn for a predetermined time period.

Referring back to step 232, when the engine is not in a speed control mode, step 238 is performed. In step 238, it is determined whether or not the engine is in a torque mode. If the engine is not in a torque mode, step 240 ends the process. In step 238, when the engine is in a torque mode, the air flow is increased, the spark is retarded to maintain a torque level and a lean burn is performed based upon the torque of the engine.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling engine operation comprising:
- determining a previous run period;
- determining a fuel mass during the previous run period;
- determining an amount of spark fouling based on the fuel mass during the previous run period; and
- controlling the engine in response to the amount of spark fouling.

2. A method as recited in claim 1 further comprising determining a beginning engine coolant temperature at a beginning of the previous run period and wherein determining an amount of spark fouling comprises determining the amount of spark fouling based on the fuel mass during the previous run period and the beginning engine coolant temperature.

3. A method as recited in claim 1 further comprising determining an ending engine coolant temperature at an end of the previous run period and wherein determining an amount of spark fouling comprises determining the amount of spark fouling based on the fuel mass during the previous run period and the ending engine coolant temperature.

4. A method as recited in claim 1 further comprising determining an ethanol percentage and wherein determining an amount of spark fouling comprises determining the amount of spark fouling based on the fuel mass during the previous run period and the ethanol percentage.

5. A method as recited in claim 1 further comprising determining a run time of the previous run period and wherein determining an amount of spark fouling comprises determining the amount of spark fouling based on the fuel mass during the previous run period and the run time.

6. A method as recited in claim 1 wherein controlling the engine comprises controlling a fuel shutoff duration.

7. A method as recited in claim 1 wherein controlling the engine comprises controlling a forced warm-up of the engine.

8. A method as recited in claim 1 wherein controlling the engine comprises controlling a crank fuel reduction coefficient.

9. A method as recited in claim 1 wherein controlling the engine comprises, in a torque mode, increasing airflow, retarding spark, and controlling the engine to burn lean.

10. A method as recited in claim 9 further comprising determining an average fuel mass and performing the steps of increasing airflow, retarding spark, and controlling the engine to burn lean when the average fuel mass is greater than a fuel mass threshold.

11. A method as recited in claim 1 wherein controlling the engine comprises, in a speed mode, increasing an engine speed and controlling the engine to burn lean.

12. A method as recited in claim 11 further comprising determining an average fuel mass and performing the steps of increasing an engine speed and controlling the engine to burn lean when the average fuel mass is greater than a fuel mass threshold.

13. A control module for controlling an engine operation comprising:

a runtime module that determines a previous run period;

a fuel mass module that determines a fuel mass during the previous run period;

a spark fouling module that determines an amount of spark fouling based on the fuel mass during the previous run period; and an engine operation module that controls the engine in response to the amount of spark fouling.

14. A control module as recited in claim 13 further comprising a coolant temperature module that determines a beginning engine coolant temperature at a beginning of the previous run period and wherein the spark fouling module determines the amount of spark fouling based on the fuel mass during the previous run period and the beginning engine coolant temperature.

15. A control module as recited in claim 13 further comprising a coolant temperature module that determines an ending engine coolant temperature at an end of the previous run period and wherein the spark fouling estimation module determines the amount of spark fouling based on the fuel mass during the previous run period and the ending engine coolant temperature.

16. A control module as recited in claim 13 further comprising a fuel composition module that determines an ethanol percentage and wherein the spark fouling module determines the amount of spark fouling based on the fuel mass during the previous run period and the ethanol percentage.

17. A control module as recited in claim 13 wherein the runtime module determines a run time of the previous run period of the engine and wherein the spark fouling module determines the amount of spark fouling based on the fuel mass during the previous run period and the run time.

18. A control module as recited in claim 13 wherein the engine operation module controls a fuel shutoff duration.

19. A control module as recited in claim 13 wherein the engine operation module controls a forced warm-up of the engine.

20. A control module as recited in claim 13 wherein the engine operation module controls a crank fuel reduction coefficient.

* * * * *